(12) United States Patent
Tabota

(10) Patent No.: US 6,810,740 B2
(45) Date of Patent: Nov. 2, 2004

(54) ACCELERATION SENSOR

(75) Inventor: Jun Tabota, Toyama-ken (JP)

(73) Assignee: Murata Manufacturing Co. Ltd., Kyoto (JP)

( * ) Notice: Subject to any disclaimer, the term of this patent is extended or adjusted under 35 U.S.C. 154(b) by 121 days.

(21) Appl. No.: 10/376,777

(22) Filed: Feb. 28, 2003

(65) Prior Publication Data
US 2003/0167844 A1 Sep. 11, 2003

(30) Foreign Application Priority Data
Feb. 28, 2002 (JP) ........................................ 2002-052680

(51) Int. Cl.[7] ............................................. G01P 15/09
(52) U.S. Cl. ................................ 73/514.34; 73/514.16; 73/514.29
(58) Field of Search ..................... 73/514.34, 514.16, 73/514.29, 514.35, 514.37, 514.38, 514.32; 310/311, 329, 385, 323.06

(56) References Cited

U.S. PATENT DOCUMENTS

| 5,063,782 A | 11/1991 | Kellett | .......................... | 73/514 |
| 2002/0139188 A1 * | 10/2002 | Ogiura | ..................... | 73/514.34 |

FOREIGN PATENT DOCUMENTS

| DE | 197 35 155 A1 | 2/1998 |
| FR | 2 784 753 | 4/2000 |
| JP | 9-271084 | 10/1997 |

* cited by examiner

Primary Examiner—Hezron Williams
Assistant Examiner—Jacques M. Saint-Surin
(74) Attorney, Agent, or Firm—Keating & Bennett, LLP

(57) ABSTRACT

An acceleration sensor includes a piezoelectric element and a support member for supporting the piezoelectric element at both longitudinal ends thereof. The piezoelectric element includes a laminate having a plurality of piezoelectric layers. An intermediate piezoelectric layer is a dummy layer which generates no charge when acceleration is applied thereto. Each of the two outer piezoelectric layers includes four longitudinally aligned regions separated at two borders and one central border where stress is inverted when the acceleration is applied. The two outer piezoelectric layers are polarized in the direction of thickness of the piezoelectric element such that cells adjacent to each other in the longitudinal direction of the piezoelectric elements have opposite polarization directions and such that cells aligned with each other in the direction of thickness have the same polarization. Electrodes are arranged on the top and bottom major surfaces of the piezoelectric element and between the piezoelectric layers so that two cells on one side of the central border are connected in parallel with the other two cells on the other side of the central border are connected in parallel in each of the two outer piezoelectric layers, and so that the two parallel-connected cells in the one side are serially connected with the other two parallel-connected cells on the other side. At least one of the electrodes on each of the top and bottom major surfaces and between the layers extends to different longitudinal end surfaces of the piezoelectric element.

14 Claims, 12 Drawing Sheets

→← TENSILE STRESS
>—< COMPRESSIVE STRESS

ACCELERATION SENSOR

BACKGROUND OF THE INVENTION

1. Field of the Invention

The present invention relates an acceleration sensor including a piezoelectric element.

2. Description of the Related Art

FIG. 11A shows a conventional acceleration sensor including a piezoelectric ceramic. The acceleration sensor includes a bimorph piezoelectric element 20 supported at one end thereof. The piezoelectric element 20 is made by bonding two piezoelectric ceramic layers 21 and 22 together and by connecting the two piezoelectric ceramic layers 21 and 22 in series. Also included are major surface electrodes 23 and 24, an interlayer electrode 25, a support member 26, and electrode leads 27 and 28. FIG. 11B is a circuit diagram of the acceleration sensor. The polarization directions P of the layers 21 and 22 are opposite to one another in the direction of thickness such that voltages generated in response to the application of acceleration G are summed.

When the acceleration sensor is subjected to a temperature change, voltages are generated in each of the layers 21 and 22 because of the pyroelectric effect. Voltages generated in the layers 21 and 22 in response to a temperature drop are shown in FIG. 11A. Since the directions of voltages of the two layers 21 and 22 are opposite, the voltages are maintained without being canceled. The voltages remain unchanged even if the electrodes on both ends of the sensor are short circuited to each other. The polarities of the voltages are inverted from those during polarization. The voltages depolarize the layers. In particular, a surface mount type acceleration sensor, which undergoes reflow mounting, is subjected to a quick temperature drop. A large pyroelectric voltage is generated which depolarizes the layers and causes a drop in sensitivity of the sensor.

FIG. 12A shows a bimorph piezoelectric element 30 including two piezoelectric ceramic layers 31 and 32 connected in parallel. FIG. 12B is a circuit diagram of the piezoelectric element 30. The two layers are polarized in the same polarization direction P such that the polarities of the voltages are the same under the application of acceleration G. The electrodes 33 and 34 on the top and bottom surfaces are connected to a pickup electrode 35, and the interlayer electrode 36 is connected to the other pickup electrode 37.

Voltage is generated in each of the layers 31 and 32 in response to a temperature change because of the pyroelectric effect. The voltage distributions are directed such that the generated voltages cancel each other in a parallel connection. The pyroelectric voltages thus cancel each other in the sensor. As a result, no voltage is generated in each of the layers 31 and 32. The sensor including the two layers 31 and 32 connected in parallel has a voltage sensitivity lower than the serially connected type sensor shown in FIG. 11A. If an insulation resistance is reduced in any portion of the layer, the sensitivity of the entire piezoelectric element is reduced. Increasing the thickness of the layer increases the sensitivity. If there is a possibility that the insulation resistance is reduced, the thickness of the layers cannot be reduced. Thus, it is difficult to increase the sensitivity.

The serial connection of the layers provides the advantage of high voltage sensitivity, while suffering from polarization drop due to the pyroelectric voltage. The parallel connection of the layers provides the advantage of preventing the polarization drop responsive to the pyroelectric voltage, but suffers from low voltage sensitivity. Furthermore, increasing the sensitivity is difficult because the thickness of the layers cannot be reduced because of the possibility of decreased insulation resistance.

SUMMARY OF THE INVENTION

To overcome the problems described above, preferred embodiments of the present invention provide an acceleration sensor having a high voltage sensitivity, and which does not depolarize due to a pyroelectric voltage.

In a first preferred embodiment of the present invention, an acceleration sensor includes a piezoelectric element and a support member for supporting the piezoelectric element at both longitudinal ends thereof. The piezoelectric element includes a laminate of three piezoelectric layers. The intermediate piezoelectric layer of the three piezoelectric layer laminate is a dummy layer which generates no charge when acceleration is applied thereto. Each of the two outer piezoelectric layers includes four longitudinally aligned regions separated at two borders and one central border where stress is inverted when the acceleration is applied. The two outer piezoelectric layers are polarized in the direction of thickness of the piezoelectric element such that cells adjacent to each other in the longitudinal direction are inverted in the polarization direction and such that cells corresponding to each other in the direction of thickness are polarized in the same polarization direction. Electrodes are arranged on the top and bottom major surfaces of the piezoelectric element and between the piezoelectric layers such that two cells on one side of the central border are connected in parallel, and the other two cells on the other side of the central border are connected in parallel in each of the two outer piezoelectric layers, and such that the two parallel-connected cells on the one side are connected in series to the other two parallel-connected cells on the other side. At least one of the electrodes on the top and bottom major surfaces and between the layers extends to different end surfaces in the longitudinal direction of the piezoelectric element.

A voltage is generated in each piezoelectric layer in response to a temperature change applied to the acceleration sensor. Two cells on one side of the central border which are disposed towards the center of the longitudinal length of the element are now discussed. Since the polarization directions of the two cells are opposite, the polarity of the pyroelectric voltage is opposite from the polarization direction. The pyroelectric voltage extends in a direction which depolarizes the cell. Since the two cells are connected in parallel, charges generated through pyroelectricity immediately cancel each other in the region of the two cells. Because of this, no depolarization occurs, and no sensitivity drop is caused.

Since the two cells on the one side of the central border and the two cells on the other side of the central border are serially connected, the voltage sensitivity is greater than that of the parallel connection type sensor.

Even if an insulation resistance is reduced between electrodes of the two cells on the one side of the central border, the two cells in the same piezoelectric layer on the other side of the central border are not affected. Since the piezoelectric layer is isolated from the other piezoelectric layer by the dummy layer, the other piezoelectric layer is also free from the reduced insulation resistance in the two cells. The effect of the reduced insulation resistance on the characteristics of the entire sensor is thus prevented. This produces a humidity resistant sensor. Given the same humidity level, a thinner piezoelectric layer operates effectively, and a more sensitive sensor is provided.

Since a detector cell is provided near the external surface of the element where a change in stress is greater than in a neutral plane, the sensitivity of the sensor is greatly increased. The thickness of the detector cell is reduced while the thickness of the sensor, which affects the durability of the sensor, is maintained. A high sensitivity sensor is thus provided.

In a second preferred of the present invention, an acceleration sensor includes a piezoelectric element and a support member for supporting the piezoelectric element at both longitudinal ends thereof. The piezoelectric element includes a laminate of two piezoelectric layers. Each of the two piezoelectric layers includes four longitudinally aligned regions separated at two borders and one central border where stress is inverted in the longitudinal direction of the piezoelectric element when the acceleration is applied. The two outer piezoelectric layers are polarized in the direction of thickness of the piezoelectric element such that cells adjacent to each other in the longitudinal direction are inverted in polarization direction and such that cells corresponding to each other in the direction of thickness are polarized in the same polarization direction. Electrodes are arranged on the top and bottom major surfaces of the piezoelectric element such that two cells on one side of the central border are connected in parallel, and the other two cells on the other side of the central border are connected in parallel in each of the two outer piezoelectric layers, and such that the two parallel-connected cells on the one side are connected in series to the other two parallel-connected cells on the other side. At least one of electrodes on the top and bottom major surfaces and between the layers extends to different end surfaces in the longitudinal direction of the piezoelectric element.

As in the acceleration sensor of the first preferred embodiment of the present invention, even if a pyroelectric voltage is generated in response to a temperature change in the acceleration sensor of the second preferred embodiment of the present invention, the charges generated in response to the pyroelectric effect immediately cancel each other within the region of the two cells because the two cells on the same side of the central border are connected in parallel. Thus, the sensitivity of the sensor is not reduced by depolarization.

Since the two cells on the one side of the central border and the two cells on the other side of the central border are serially connected, the voltage sensitivity is greater than that of the parallel connection type sensor.

Even if an insulation resistance is reduced between electrodes of the two cells on the one side of the central border, the two cells in the same piezoelectric layer on the other side of the central border are not affected.

Since the number of piezoelectric layers and the number of electrodes are reduced, manufacturing costs are reduced.

Other features, elements, characteristics and advantages of the present invention will become more apparent from the following detailed description of preferred embodiments of the present invention with reference to the attached drawings.

DETAILED DESCRIPTION OF PREFERRED EMBODIMENTS

FIGS. 1 through 5 illustrate the acceleration sensor 1A in accordance with a first preferred embodiment of the present invention.

The acceleration sensor 1A includes a piezoelectric element (detector element) 2 which is supported at both ends by a pair of substantially U-shaped support frames 10 and 11. The support frames 10 and 11 are preferably made of an electrically insulative ceramic having a thermal expansion coefficient approximately the same as that of the piezoelectric element 2. The support frames 10 and 11 include spaces 10a and 11a within which the piezoelectric element 2 is deformed when acceleration G is applied thereto.

Figure 1:
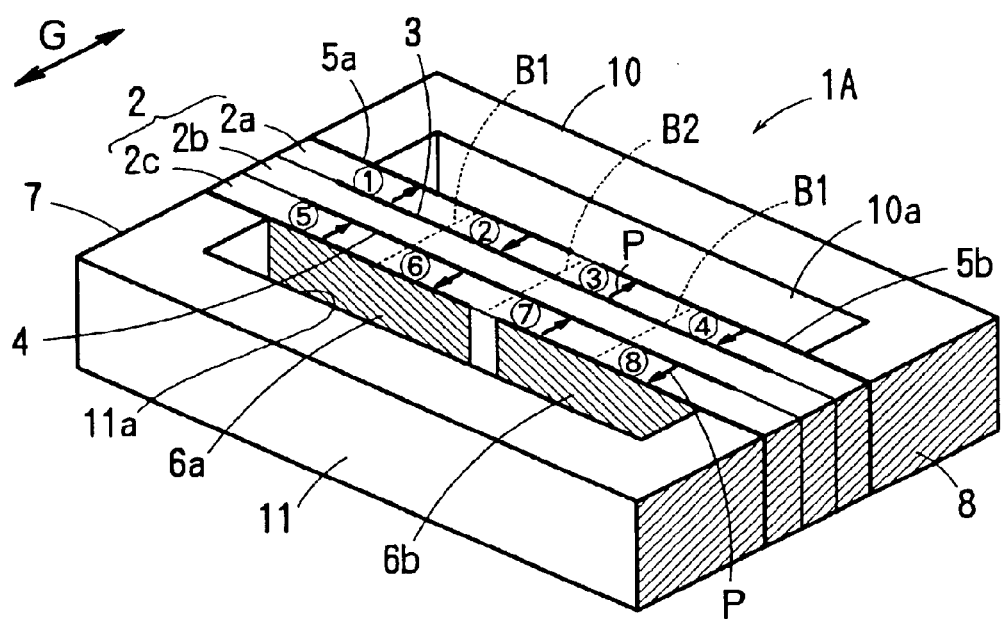
FIG. 1 is a perspective view of the acceleration sensor in accordance with a first preferred embodiment of the present invention.
Figure 2:
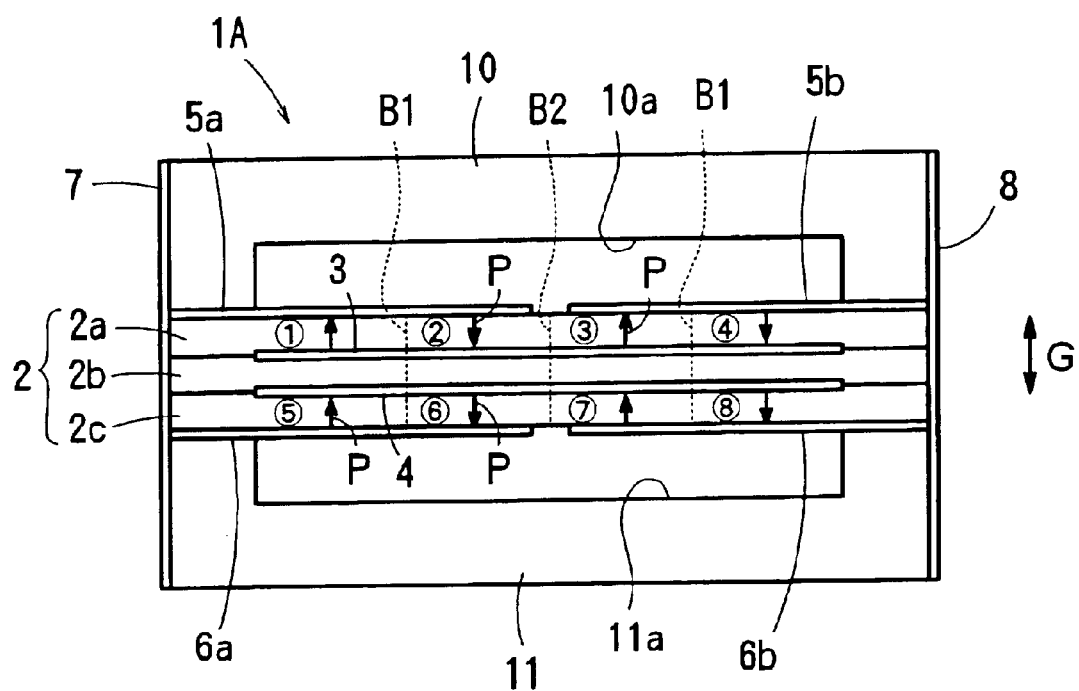
FIG. 2 is a front view of the acceleration sensor of FIG. 1.

The piezoelectric element 2 of the first preferred embodiment is made preferably by laminating three thin substantially rectangular piezoelectric layers 2a, 2b and 2c and by baking the laminate. The three layers may or may not have the same thickness. The outer layers 2a and 2c are preferably thinner than the intermediate layer 2b. Electrodes 3 and 4 are arranged between the layers in the piezoelectric element 2, and electrodes 5a and 5b and electrodes 6a and 6b are arranged on top and bottom major surfaces of the piezoelectric element 2. The intermediate layer 2b is a dummy layer which generates no charge when acceleration G is applied thereto. Each of the two outer piezoelectric layers 2a and 2c includes four longitudinally aligned regions separated at two borders B1 and a central border B2 where stress is inverted in response to applied acceleration G. Eight cells (1) through (8) are respectively formed of eight regions. The eight cells (1) through (8) are polarized such that adjacent cells in the longitudinal direction are inverted in polarization direction, while cells in the direction of thickness are polarized in the same direction. In other words, the polarization directions in cells (1), (3), (5), and (7) are opposite to the polarization directions in cells (2), (4), (6), and (8). Referring to FIGS. 1 and 2, the polarization directions P are represented by bold arrows.

Preferably, the intermediate layer 2b is not polarized. The intermediate layer 2b has a neutral plane of deflection at the center of thickness. Stresses above and below the neutral plane are inverted, thereby canceling generated voltages.

Each of the interlayer electrodes 3 and 4 extends continuously over four cells except for longitudinal end portions of the piezoelectric element 2. The electrodes 5a and 5b on the top major surface are separated along the central border B2 and the electrodes 6a and 6b on the bottom major surface are separated along the central border B2. These major surface electrodes 5a and 5b, and 6a and 6b extend to different longitudinal end surfaces of the piezoelectric element 2 to output generated charges.

External electrodes 7 and 8 are provided on the longitudinal end surfaces of the piezoelectric element 2 and longitudinal end surfaces of the support frames 10 and 11. The external electrode 7 provided on one end surface of the piezoelectric element 2 is electrically connected to the top major surface electrodes 5a and the bottom major surface electrode 6a, and the external electrode 8 provided on the other end surface of the piezoelectric element 2 is electrically connected to the top major surface electrode 5b and bottom major surface electrode 6b.

Figure 3:
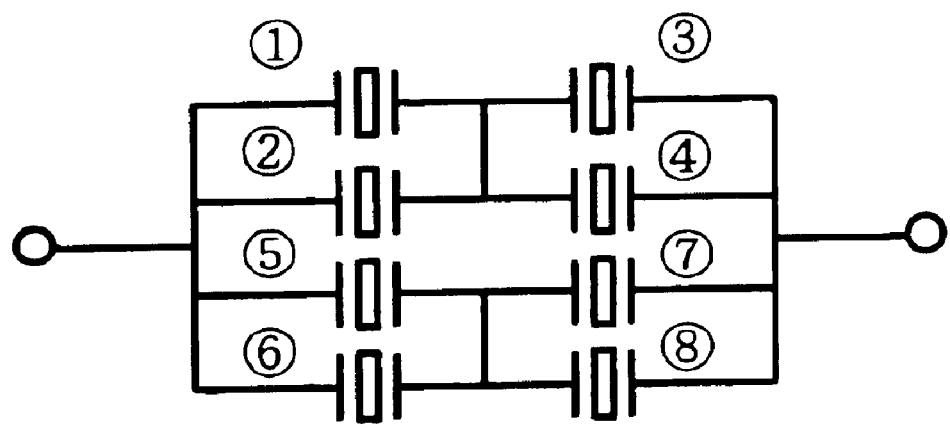
FIG. 3 is a circuit diagram of the acceleration sensor of FIG. 1.

A circuit shown in FIG. 3 is provided by arranging the interlayer electrodes 3 an 4, top and bottom major surface electrodes 5a, 5b, 6a and 6b, and external electrodes 7 and 8. The two cells (1) and (2) on one side of the central border B2 are connected in parallel, the two cells (3) and (4) on the other side of the central border B2 are connected in parallel in the piezoelectric layer 2a, and the two cells (1) and (2) connected in parallel and the two cells (3) and (4) connected in parallel are then connected in series. Similarly, in the other piezoelectric layer 2c, the two cells (5) and (6) on one side of the central border B2 are connected in parallel, the two cells (7) and (8) on the other side of the central border B2 are connected in parallel, and the two cells (5) and (6) connected in parallel and the two cells (7) and (8) connected in parallel are connected in series. A connection of the cells (1) through (4) in the layer 2a and a connection of the cells (5) through (8) in the other layer 2c are electrically connected in parallel.

The charge generation of the acceleration sensor 1A in response to the application of the acceleration G will now be discussed with reference to FIG. 4.

Figure 4:
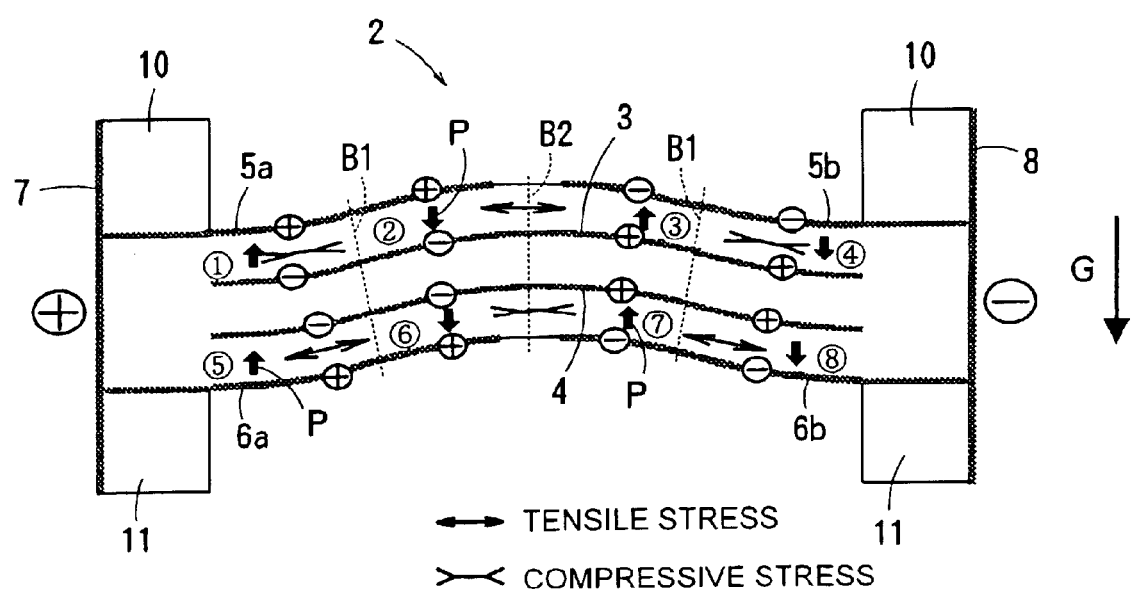
FIG. 4 illustrates operation of the acceleration sensor of FIG. 1 with acceleration G applied thereto.

If the acceleration G is applied in a downward direction as represented by an arrow shown in FIG. 4, a central portion of the piezoelectric element 2 is bent upward through inertia. A tensile stress is applied to the central cells (2) and (3) of the top piezoelectric layer 2a, while a compressive stress is applied to the side cells (1) and (4). On the other hand, a compressive stress is applied to the central cells (6) and (7) in the bottom plezoetectric layer 2c, while a tensile stress is applied to the side cells (5) and (8). Depending on the relationship between the above-mentioned stress and the polarization direction P, a positive charge is generated in the one top major surface electrode 5a and a negative charge is generated in the other top major surface electrode 5b. A positive charge is generated in the one bottom major surface electrode 6a, and a negative charge is generated in the other bottom major surface electrode 6b. A negative charge is generated in one portion of the interlayer electrode 3, and a positive charge is generated in the other portion of the interlayer electrode 3 with the border B2 separating the one portion from the other portion. Similarly, a negative charge is generated in one portion of the interlayer electrode 4, and a positive charge is generated in the other portion of the interlayer electrode 4 with the border B2 separating the one portion from the other portion. The charges generated in the electrodes 3 and 4 cancel each other. As a result, the positive charge is detected through the external electrode 7 connected to the electrodes 5a and 6a, and the negative charge is detected through the external electrode 8 connected to the electrodes 5b and 6b.

In the acceleration sensor 1A, the parallel connection of cells (1) and (2) and the parallel connection of cells (3) and (4) are connected in series in the piezoelectric layer 2a, and the parallel connection of cells (5) and (6) and the parallel connection of cells (7) and (8) are connected in series in the intermediate layer 2c. The voltages of the two parallel connections are summed. The generated voltage in each layer is thus increased. The acceleration sensor 1A provides a voltage sensitivity that is greater than the parallel connection type acceleration sensor. The use of the intermediate layer 2b enables the piezoelectric layers 2a and 2c to be arranged in top and bottom planes where stress is greater than in the neutral plane. The amount of charge generated in the detecting piezoelectric layers 2a and 2c is thus increased, and a sensor having greatly increase sensitivity is produced.

The piezoelectric element 2 must be thick enough for mechanical durability. The three-layer structure enables the thickness of each of the piezoelectric layers 2a and 2c to be reduced while maintaining the mechanical durability. The sensitivity of the sensor is thus greatly increased.

If the acceleration sensor 1A is used in high humidity environments, an insulation resistance between facing electrodes may decrease. The insulation resistance of the parallel connection of the cells (1) and (2) between the electrodes 5a and 3, if reduced, does not adversely affect another parallel connection of cells (3) and (4) in the same layer. Since the intermediate layer 2b separates the layer 2a from the other layer 2c, the layer 2c is not damaged if the layer 2a is damaged. The effect of the reduced resistance of the parallel connection of the cells (1) and (2) on the characteristics of the entire sensor is thus minimized. In other words, a humidity-resistant and high-sensitivity sensor is provided with the thinner layers 2a and 2c.

Figure 5:
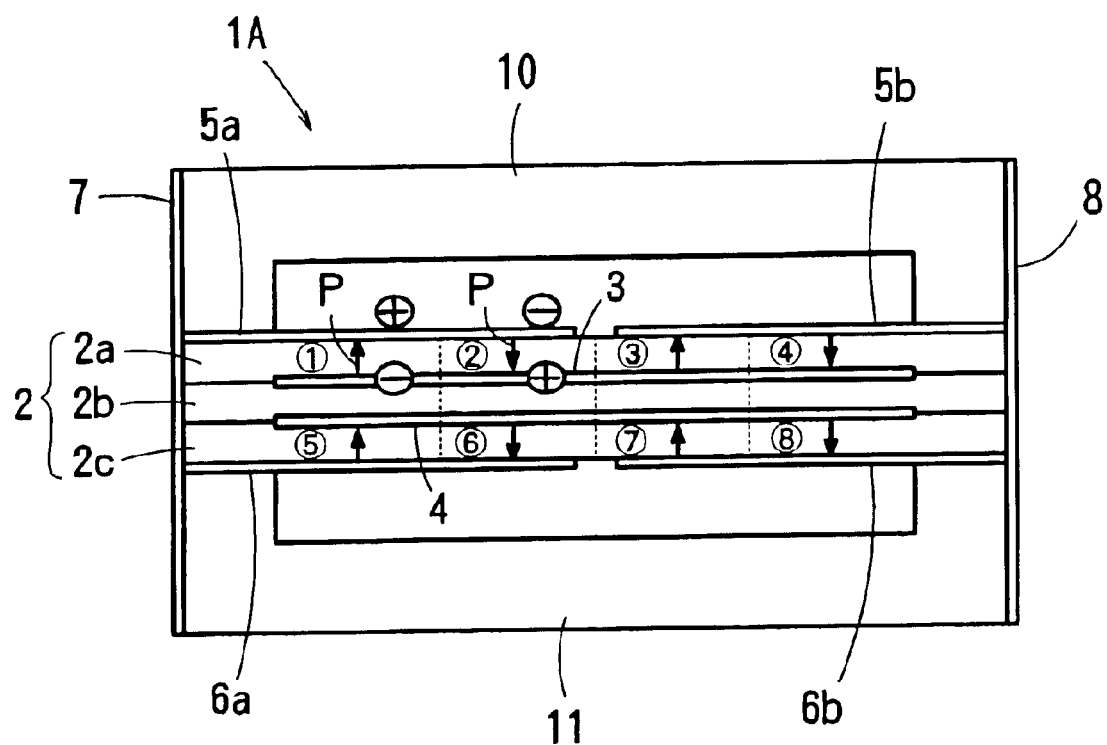
FIG. 5 illustrates pyroelectric voltages generated in the acceleration sensor of FIG. 1 during a temperature fall.

FIG. 5 shows pyroelectric voltages generated in the cells (1) and (2) during a decrease in temperature. In the cell (1), a positive charge is generated in the top surface electrode 5a, and a negative charge is generated in the interlayer electrode 3. In the cell (2), a negative charge is generated in the top surface electrode 5a, and a positive charge is generated in the interlayer electrode 3. The direction of the resulting electric fields is opposite from the polarity of the voltage during polarization, thereby being the same as the depolarization direction. However, the cells (1) and (2) are connected in parallel, and the directions of the voltages generated in the connected electrodes 5a and 3 are opposite. The charges generated through the pyroelectric effect immediately cancel each other in the region of the cells (1) and (2). Thus, no voltage is generated. Similarly, no pyroelectric voltages are generated in the remaining cells (3) through (8).

A board of a surface-mount type acceleration sensor is subjected to a reflow process. When the board is removed from within a reflow bath, the board is subjected to a quick decrease in temperature. Pyroelectric voltage is thus generated in the board. However, since charges cancel each other in the cells as described above, the sensitivity of the sensor is not reduced by depolarization. Even when the sensor is subject to repeated temperature changes experienced during use, no pyroelectric voltage is generated, and no depolarization occurs. A sensor having greatly improved reliability is thus provided.

Figure 6:
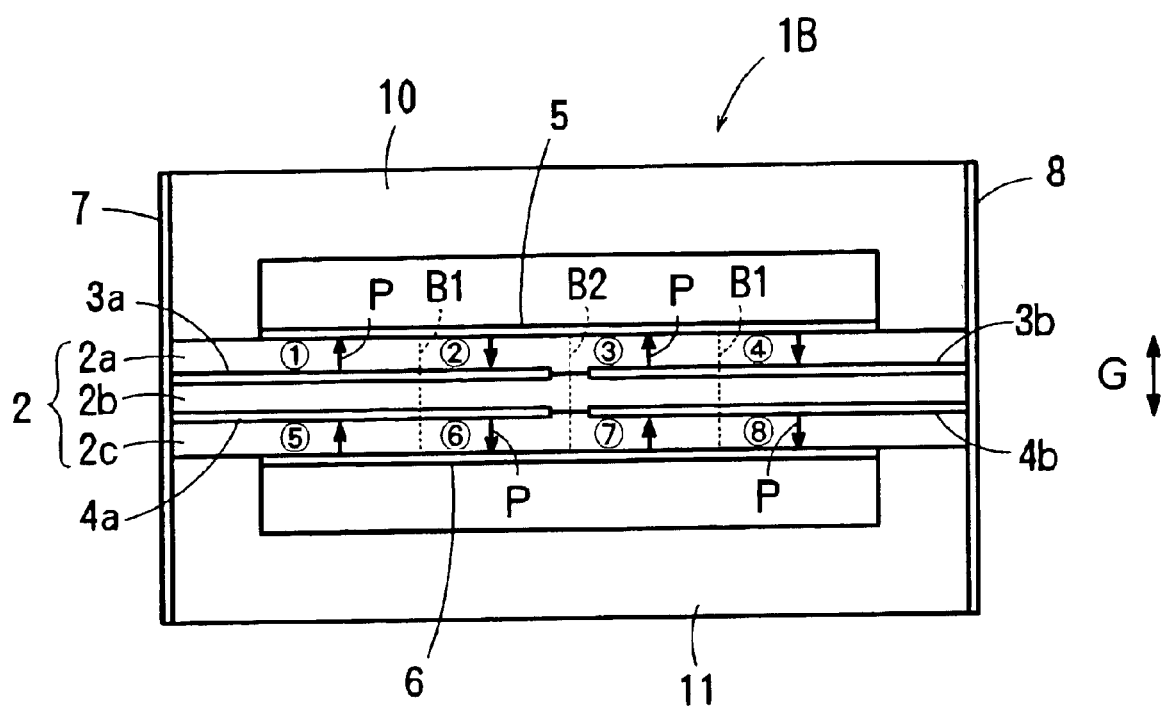
FIG. 6 is a front view of the acceleration sensor in accordance with a second preferred embodiment of the present invention.

FIG. 6 illustrates the acceleration sensor 1B of a second preferred embodiment of the present invention.

The acceleration sensor 1B is similar to the acceleration sensor 1A except that the arrangement of the interlayer electrodes and the top and bottom major surface electrodes are interchanged in the piezoelectric element 2. Components identical to those described in connection with the first preferred embodiment are designated with the same reference numerals, and the discussion thereof is omitted here.

Interlayer electrodes 3*a* and 3*b* are separated from each other at the central border B2 located at the approximate center of the length of the piezoelectric element 2, and interlayer electrodes 4*a* and 4*b* are separated from each other at the central border B2. The interlayer electrodes 3*a* and 4*a*, and the interlayer electrodes 3*b* and 4*b* extend to different longitudinal end surfaces of the piezoelectric element 2. The interlayer electrodes 3*a* and 4*a* are connected to an external electrode 7, and the interlayer electrodes 3*b* and 4*b* are connected to an external electrode 8. The top and bottom major surface electrodes 5 and 6 extend continuously, covering the four cells (1) through (4) and the four cells (5) through (8) except at both longitudinal end portions of the piezoelectric element 2.

A circuit formed of the eight cells (1) through (8) is identical to that illustrated in FIG. 3, and the polarization directions P of the cells (1) through (8) are the same as those in the first preferred embodiment.

Like the acceleration sensor 1A, the acceleration sensor 1B also provides the same advantages including increased sensitivity, prevention of the depolarization due to the pyroelectric voltage, and reduction of the effect of the reduced insulation resistance on the characteristic of the sensor.

Figure 7:
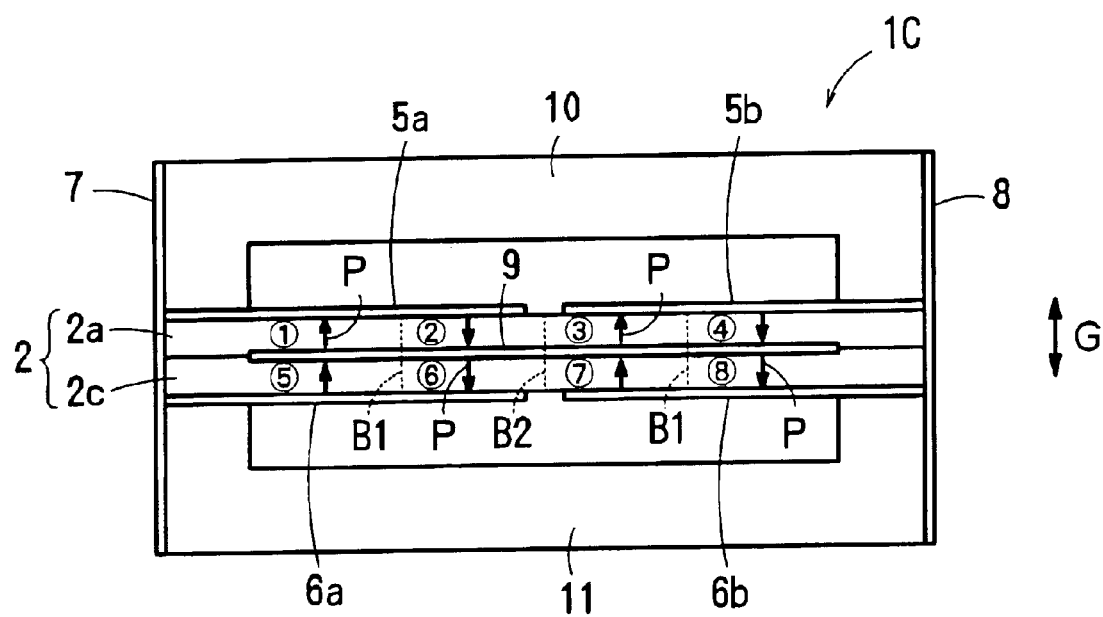
FIG. 7 is a perspective view of the acceleration sensor in accordance with a third preferred embodiment of the present invention.
Figure 8:
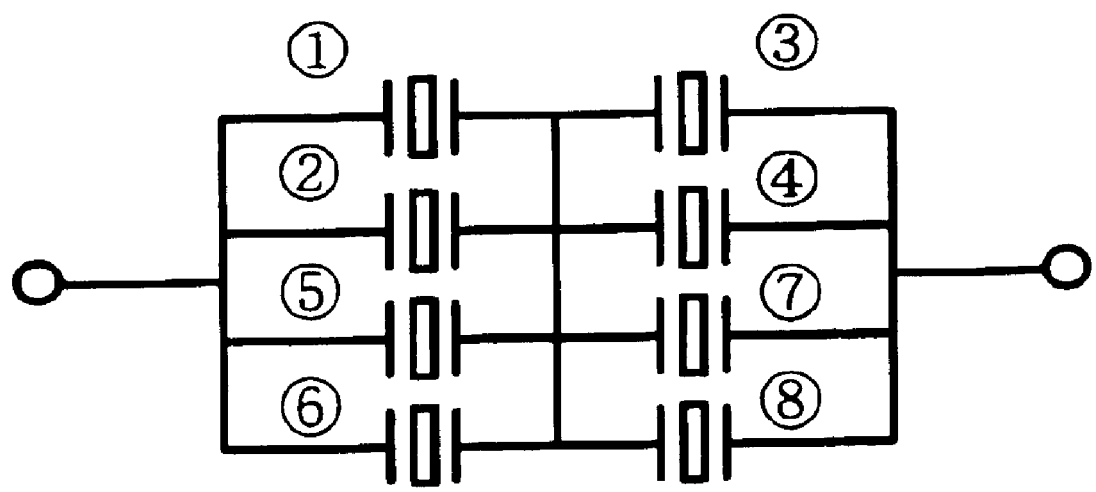
FIG. 8 is a circuit diagram of the acceleration sensor of FIG. 7.
Figure 9:
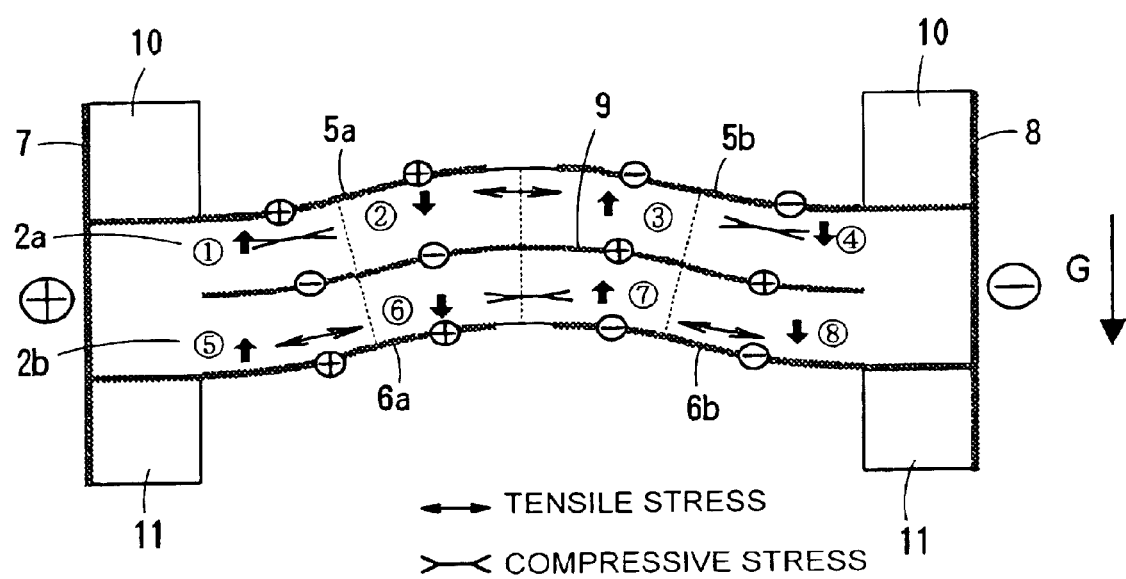
FIG. 9 illustrates operation of the acceleration sensor of FIG. 7 with acceleration G applied thereto.

FIGS. 7 through 9 illustrate the acceleration sensor 1C of a third preferred embodiment of the present invention.

The acceleration sensor 1C includes no dummy layer, and instead includes a two-layered piezoelectric element 2, and a single interlayer electrode 9. Components identical to those discussed in connection with the first preferred embodiment are designated with the same reference numerals and the discussion thereof is omitted here.

In the third preferred embodiment, the directions of the polarizations P of the cells (1) through (8) in each of the piezoelectric layers 2*a* and 2*c* is the same as those in the first preferred embodiment (see FIG. 2). Like the interlayer electrodes 3 and 4 in the first preferred embodiment, the central interlayer electrode 9 extends continuously in the longitudinal direction, covering the four longitudinally aligned cells.

In the acceleration sensor 1C, a circuit shown in FIG. 8 is formed by arranging the interlayer electrode 9, top and bottom electrodes 5*a*, 5*b*, 6*a*, and 6*b*, and external electrodes 7 and 8. Four cells (1), (2), (5), and (6) on one side of the central border B2 are connected in parallel, and four cells (3), (4), (7), and (8) on the other side of the central border B2 are connected in parallel. The parallel connection of the cells (1), (2), (5), and (6) is connected in series with the parallel connection of the cells (3), (4), (7), and (8).

If acceleration G is applied in a downward direction as represented by an arrow shown in FIG. 9, a tensile stress is applied to the central cells (2) and (3) of the top piezoelectric layer 2*a*, while a compressive stress is applied to the side cells (1) and (4). On the other hand, a compressive stress is applied the central cells (6) and (7) in the bottom piezoelectric layer 2*c*, while a tensile stress is applied to the side cells (5) and (8). Depending on the relationship between the above-mentioned stress and the polarization direction, a positive charge is generated in the one top major surface electrode 5*a* and a negative charge is generated in the other top major surface electrode 5*b*. A positive charge is generated in the one bottom major surface electrode 6*a*, and a negative charge is generated in the other bottom major surface electrode 6*b*. A negative charge is generated in one portion of the interlayer electrode 9, and a positive charge is generated in the other portion of the interlayer electrode 9 with the border B2 delineating the one portion from the other portion. Charges generated in the electrode 9 cancel each other. As a result, the positive charge is detected through the external electrode 7 connected to the electrodes 5*a* and 6*a*, and the negative charge is detected through the external electrode 8 connected to the electrodes 5*b* and 6*b*.

In the acceleration sensor 1C, the parallel connection of cells (1), (2), (5), and (6) and the parallel connection of cells (3), (4), (7), and (8) are connected in series. The sensitivity of the sensor is greatly improved. Even if a pyroelectric voltage is generated, opposite charges generated in the cells immediately cancel each other because the cells (1), (2), (5), and (6) are connected in parallel, and the cells (3), (4), (7), and (8) are connected in parallel.

For example, when the insulation resistance is reduced in the cell (1), the remaining cells (2), (5), and (6) are affected, but the insulation resistance of the other cells (3), (4), (7), and (8) is not adversely affected. Thus, half the cells remain effective. The effect of the reduced insulation resistance on the entire sensor is thus prevented, and a humidity-resistant sensor is provided.

Since the piezoelectric element 2 includes the two layers 2*a* and 2*c*, the number of layers and the number of electrodes are reduced. Manufacturing costs are reduced.

Figure 10:
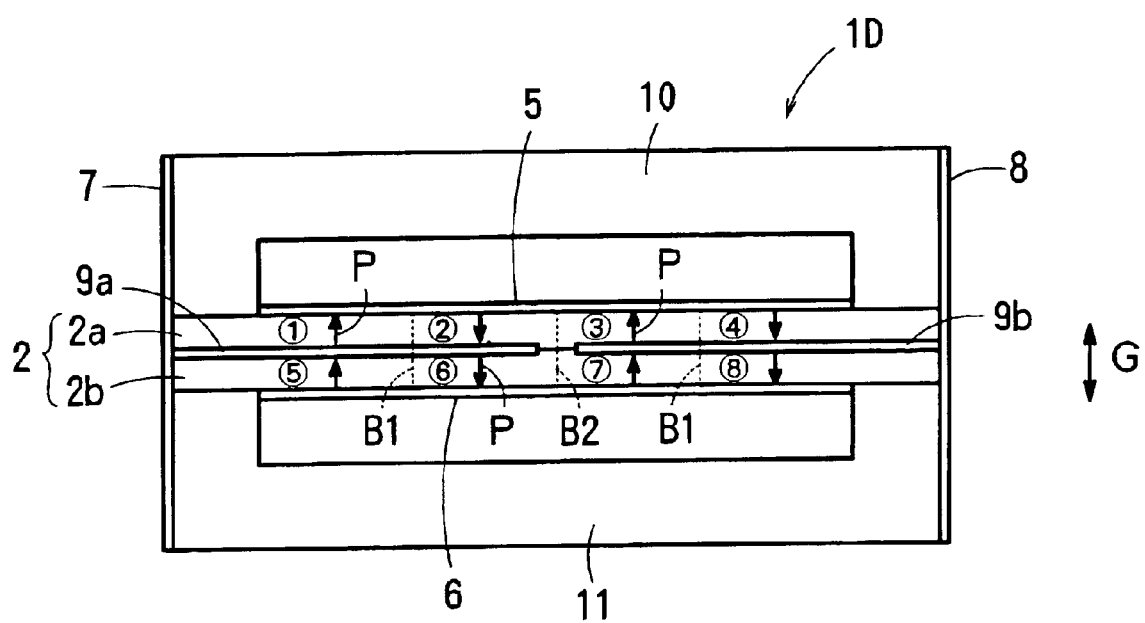
FIG. 10 is a front view of the acceleration sensor in accordance with a fourth preferred embodiment of the present invention.
Figure 11A:
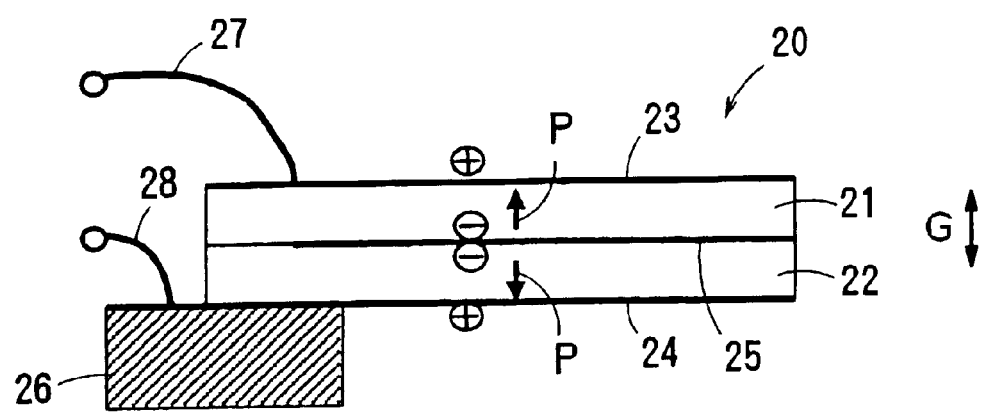
FIG. 11A is a side view of a conventional acceleration sensor and FIG. 11B is a circuit diagram of the conventional acceleration sensor.
Figure 11B:
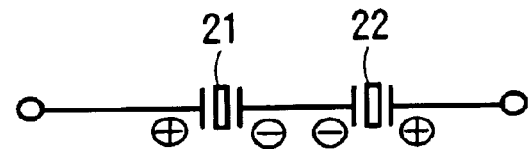
Figure 12A:
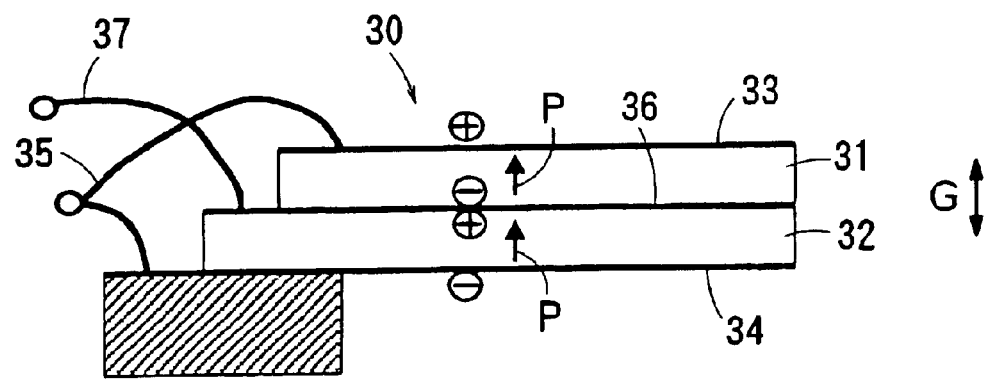
FIG. 12A is a side view of another conventional acceleration sensor.
Figure 12B:
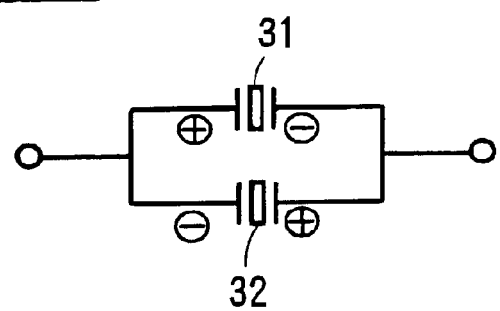
FIG. 12B is a circuit diagram of the conventional acceleration sensor.

FIG. 10 shows the acceleration sensor 1D of a fourth preferred embodiment of the present invention.

The acceleration sensor 1D is identical to the acceleration sensor 1B of the second preferred embodiment except that the acceleration sensor 1D has a two-layer construction without a dummy layer and includes two longitudinally aligned interlayer electrodes 9*a* and 9*b*. Components identical to those discussed in connection with the first preferred embodiment are designated with the same reference numerals, and the discussion thereof is omitted here.

The interlayer electrodes 9*a* and 9*b* are separated at the central border B2, and extend to different longitudinal end surfaces of the piezoelectric element 2 and are respectively connected to external electrodes 7 and 8 for outputting generated charges. Top and bottom major surface electrodes 5 and 6 extend continuously, covering four cells (1) through (4) and four cells (5) through (8) except at both longitudinal end portions of the piezoelectric element 2.

A circuit formed of the eight cells (1) through (8) is the same as that shown in FIG. 3, and the polarization directions P of the cells (1) through (8) are the same as those of the first preferred embodiment.

Similar to the acceleration sensor 1A, the acceleration sensor 1D also provides the same advantages including the increase in sensitivity as a result of the serial connection, and prevention of the depolarization due to the pyroelectric voltage. A smaller number of piezoelectric layers and a smaller number of electrodes result in low manufacturing costs.

It should be understood that the foregoing description is only illustrative of the present invention. Various alternatives and modifications can be devised by those skilled in the art without departing from the present invention. Accordingly, the present invention is intended to embrace all such alternatives, modifications and variances which fall within the scope of the appended claims.

What is claimed is:

1. An acceleration sensor comprising:

a piezoelectric element; and a support member for supporting the piezoelectric element at both longitudinal ends thereof; wherein the piezoelectric element includes a laminate having at least three piezoelectric layers;

an intermediate piezoelectric layer of the at least three piezoelectric layers is a dummy layer which generates no charge when acceleration is applied thereto;

each of two outer piezoelectric layers of the at least three piezoelectric layers includes at least four longitudinally aligned regions defining cells which are separated at two borders and one central border where stress is inverted when the acceleration is applied;

the two outer piezoelectric layers are polarized in the direction of thickness of the piezoelectric element such that the cells which are adjacent to each other in a longitudinal direction of the laminate have opposite polarization directions and such that cells which are aligned with each other in the direction of thickness of the laminate are polarized in the same polarization direction;

electrodes are arranged on the top and bottom major surfaces of the piezoelectric element and between the piezoelectric layers such that a first pair of the cells located on one side of the central border are connected in parallel, and a second pair of the cells located on the other side of the central border are connected in parallel in each of the two outer piezoelectric layers, and such that the first pair of parallel-connected cells on the one side are connected in series to the second pair of parallel-connected cells on the other side; and at least one of the electrodes on each of the top and bottom major surfaces and between the layers extend to different end surfaces in the longitudinal direction of the piezoelectric element.

2. The acceleration sensor according to claim 1, wherein the electrodes arranged between the piezoelectric layers extend continuously over all of the cells except for longitudinal end portions of the piezoelectric layers.

3. The acceleration sensor according to claim 1, wherein external electrodes are provided on longitudinal end surfaces of the support structure.

4. The acceleration sensor according to claim 1, wherein the Intermediate piezoelectric layer is not polarized.

5. The acceleration sensor according to claim 1, wherein the electrodes arranged on the top and bottom surfaces of the piezoelectric element extend continuously over all of the cells except for longitudinal end portions of the piezoelectric layers.

6. The acceleration sensor according to claim 1, wherein the electrodes arranged on the top and bottom surfaces of the piezoelectric element extend to different end surfaces in the longitudinal direction of the piezoelectric element.

7. The acceleration sensor according to claim 1, wherein the electrodes arranged between the piezoelectric layers extend to different end surfaces in the longitudinal direction of the piezoelectric element.

8. An acceleration sensor comprising:

a piezoelectric element; and a support member for supporting the piezoelectric element at both longitudinal ends thereof; wherein the piezoelectric element includes a laminate having at least two piezoelectric layers;

each of the two piezoelectric layers includes four longitudinally aligned regions defining cells which are separated at two borders and one central border where stress is inverted when acceleration is applied;

the at least two piezoelectric layers are polarized in the direction of thickness of the piezoelectric element such that the cells which are adjacent to each other in a longitudinal direction of the laminate have opposite polarization directions and such that the cells which are aligned with each other in the direction of thickness are polarized in the same polarization direction;

electrodes are arranged on the top and bottom major surfaces of the piezoelectric element and between the piezoelectric layers such that a first pair of the cells located on one side of the central border are connected in parallel, and a second pair of the cells located on the other side of the central border are connected in parallel in each of the two outer piezoelectric layers, and such that the first pair of parallel-connected cells on the one side are connected in series to the second pair of parallel-connected cells on the other side; and at least one of the electrodes on each of the top and bottom major surfaces and between the layers extend to different end surfaces in the longitudinal of the piezoelectric element.

9. The acceleration sensor according to claim 8, wherein the electrodes arranged between the piezoelectric layers extend continuously over all of the cells except for longitudinal end portions or the piezoelectric layers.

10. The acceleration sensor according to claim 8, wherein external electrodes are provided on longitudinal end surfaces of the support structure.

11. The acceleration sensor according to claim 8, further comprising an intermediate piezoelectric layer that is not polarized.

12. The acceleration sensor according to claim 8, wherein the electrodes arranged on the top and bottom surfaces of the piezoelectric element extend continuously over all of the cells except for longitudinal end portions of the piezoelectric layers.

13. The acceleration sensor according to claim 8, wherein the electrodes arranged on the top and bottom surfaces of the piezoelectric element extend to different end surfaces in the longitudinal direction of the piezoelectric element.

14. The acceleration sensor according to claim 8, wherein the electrodes arranged between the piezoelectric layers extend to different end surfaces in the longitudinal direction of the piezoelectric element.

* * * * *